United States Patent
Eun et al.

(10) Patent No.: US 9,838,585 B2
(45) Date of Patent: Dec. 5, 2017

(54) METHOD AND APPARATUS FOR CONTROLLING A DEVICE IDENTIFIED FROM A SCREEN INPUT BY A CAMERA

(75) Inventors: Dong-jin Eun, Seoul (KR); Hark-joon Kim, Gyeonggi-do (KR); Seong-hoon Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 435 days.

(21) Appl. No.: 13/355,083

(22) Filed: Jan. 20, 2012

(65) Prior Publication Data

US 2012/0188155 A1    Jul. 26, 2012

(30) Foreign Application Priority Data

Jan. 20, 2011    (KR) ........................ 10-2011-0005987

(51) Int. Cl.
*H04N 5/232*    (2006.01)
(52) U.S. Cl.
CPC ......... *H04N 5/232* (2013.01); *H04N 5/23216* (2013.01)
(58) Field of Classification Search
CPC ........................... H04N 5/232; H04N 5/23216
USPC .................................................. 345/173–178
See application file for complete search history.

(56) References Cited

U.S. PATENT DOCUMENTS

| | | | |
|---|---|---|---|
| 5,410,326 A | 4/1995 | Goldstein | |
| 6,133,847 A | 10/2000 | Yang | |
| 6,704,777 B2 | 3/2004 | Matsumoto et al. | |
| 2007/0147230 A1 | 6/2007 | Yasuda | |
| 2007/0214368 A1* | 9/2007 | Ota et al. ...................... | 713/189 |
| 2007/0296604 A1 | 12/2007 | Koyata | |
| 2008/0247757 A1* | 10/2008 | Um et al. ...................... | 398/106 |
| 2009/0102859 A1 | 4/2009 | Athsani et al. | |
| 2009/0132923 A1 | 5/2009 | Han et al. | |
| 2009/0178006 A1 | 7/2009 | Lemay et al. | |
| 2009/0185763 A1* | 7/2009 | Park et al. ................... | 382/311 |
| 2010/0161744 A1 | 6/2010 | Kim et al. | |
| 2010/0245680 A1 | 9/2010 | Tsukada et al. | |
| 2011/0037712 A1* | 2/2011 | Kim et al. .................... | 345/173 |
| 2011/0148922 A1* | 6/2011 | Son ........................ | A63F 13/12 |
| | | | 345/633 |
| 2011/0157004 A1* | 6/2011 | Ohashi ......................... | 345/156 |
| 2011/0170787 A1* | 7/2011 | Gum ............................ | 382/209 |

(Continued)

FOREIGN PATENT DOCUMENTS

| | | |
|---|---|---|
| EP | 1 705 883 | 9/2006 |
| JP | 11-110412 | 4/1999 |
| JP | 2000-194467 | 7/2000 |

(Continued)

OTHER PUBLICATIONS

Japanese Office Action dated Aug. 31, 2015 issued in counterpart application No. 2013-550376, 10 pages.

(Continued)

*Primary Examiner* — Nelson Rosario
*Assistant Examiner* — Chun-Nan Lin
(74) *Attorney, Agent, or Firm* — The Farrell Law Firm, P.C.

(57) ABSTRACT

A method of controlling a device is provided including identifying a registered device from a screen input by a camera, receiving a user input for the identified device, and transmitting a control command corresponding to the input to the identified device.

24 Claims, 12 Drawing Sheets

(56) References Cited

U.S. PATENT DOCUMENTS

2011/0267291 A1* 11/2011 Choi et al. .................. 345/173
2012/0290981 A1 11/2012 Uchida

FOREIGN PATENT DOCUMENTS

| JP | 2005-065118 | 3/2005 |
|---|---|---|
| JP | 2005-157565 | 6/2005 |
| JP | 2006-091147 | 4/2006 |
| JP | 2007-072548 | 3/2007 |
| JP | 2008-079206 | 4/2008 |
| JP | 2008-287871 | 11/2008 |
| KR | 1020080078217 | 8/2008 |
| KR | 1020090041037 | 4/2009 |
| KR | 1020100040373 | 4/2010 |
| KR | 1020100070765 | 6/2010 |
| RU | 2 182 349 | 5/2002 |
| WO | WO 02/33496 | 4/2002 |
| WO | WO 2011/086956 | 7/2011 |

OTHER PUBLICATIONS

Australian Examination Report dated Mar. 24, 2017 issued in counterpart application No. 2015255302, 3 pages.
Canadian Office Action dated Jun. 1, 2015 issued in counterpart application No. 2,819,016, 5 pages.
Chinese Office Action dated Nov. 24, 2015 issued in counterpart application No. 201180065120.4, 11 pages.
Canadian Office Action dated Apr. 19, 2016 issued in counterpart application No. 2,819,016, 3 pages.
Australian Examination Report dated Dec. 12, 2016 issued in counterpart application No. 2015255302, 5 pages.
Korean Office Action dated Jul. 3, 2017 issued in counterpart application No. 10-2011-0005987, 6 pages.
Japanese Office Action dated Aug. 14, 2017 issued in counterpart application No. 2016-114672, 7 pages.
European Search Report dated Jul. 18, 2017 issued in counterpart application No. 11856546.4-1903, 21 pages.

* cited by examiner

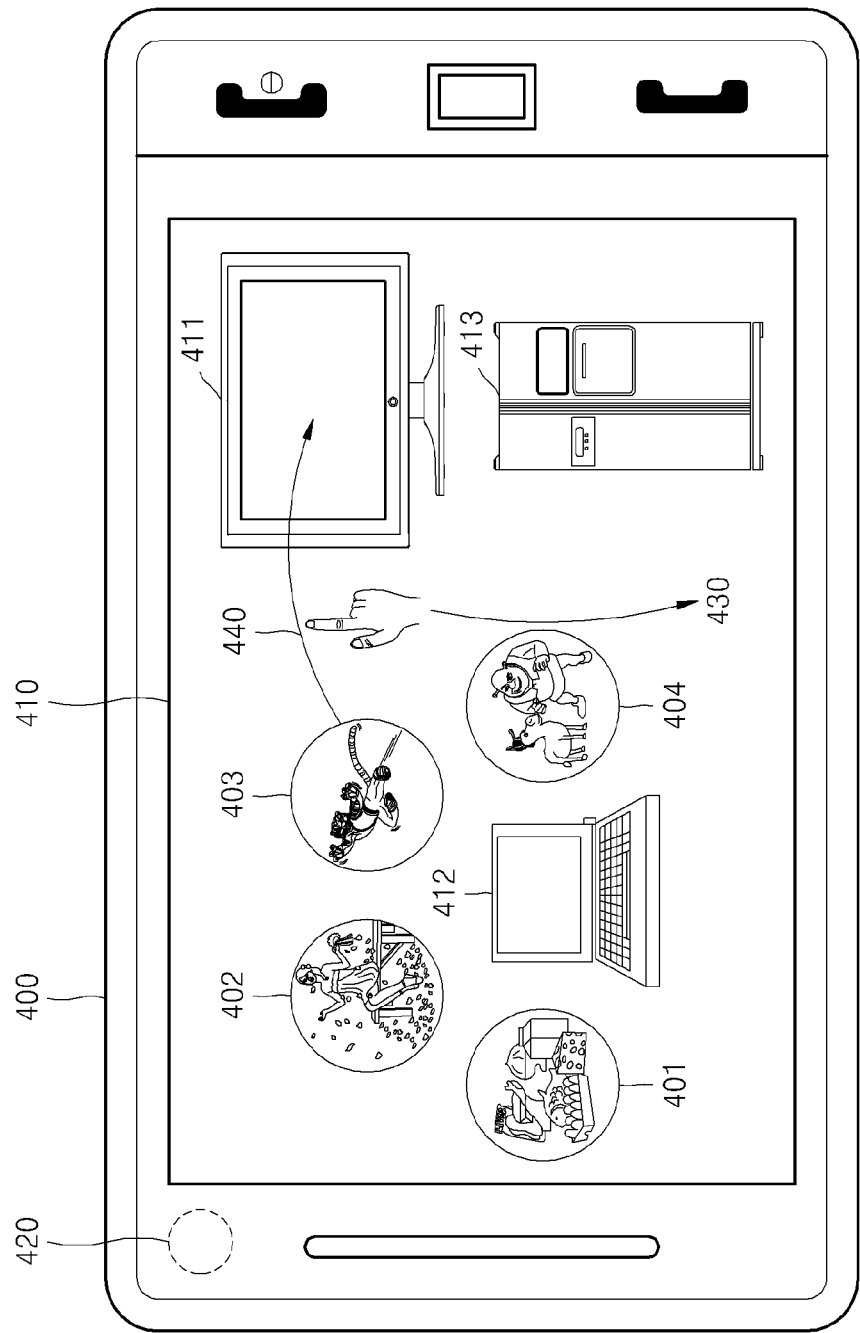

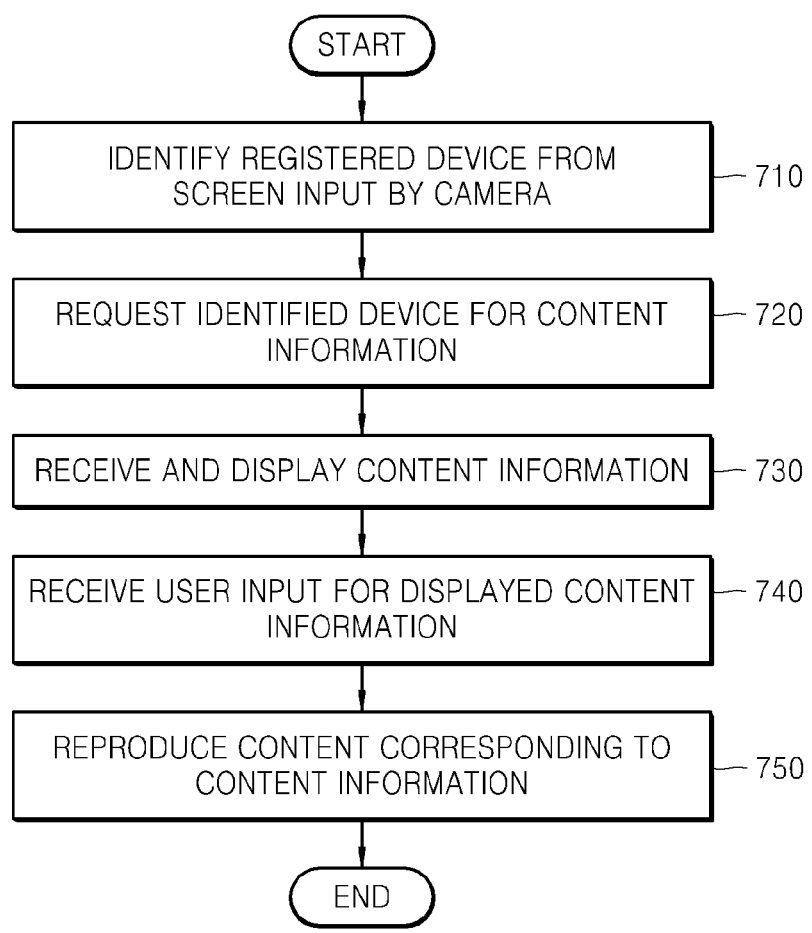

METHOD AND APPARATUS FOR CONTROLLING A DEVICE IDENTIFIED FROM A SCREEN INPUT BY A CAMERA

PRIORITY

This application claims priority under 35 U.S.C. §119(a) to Korean Patent Application No. 10-2011-0005987, filed on Jan. 20, 2011 in the Korean Intellectual Property Office, the entire disclosure of which is incorporated herein by reference.

BACKGROUND OF THE INVENTION

1. Field of the Invention

The present invention relates generally to a method and apparatus for controlling a device, and more particularly, to a method and apparatus for controlling a content reproducing device, by which content of a device recognized in an image captured by a camera is displayed and reproduced in another device connected to the device.

2. Description of the Related Art

Presently, the Augmented Reality (AR) technology is widely used in our society and culture. In particular, the introduction of high-performance smartphones and tablet Personal Computers (PCs) increases the practical use of AR-related application software. AR is technology that displays a virtual object to overlap with the real world as viewed by a user. Since the AR technology displays a single image in which the real world is displayed in real-time mixed with a virtual world having additional information, AR is also called Mixed Reality (MR). AR technology has been being researched and developed as hybrid Virtual Reality (VR) systems merging a real environment and a virtual environment since the late 1990s, mostly in the United States and Japan.

Although AR is a concept in which the real world is displayed with a virtual world, which is created with a computer graphics technique, the main part is a real environment. The computer graphics technique additionally provides information required for the real environment. This means that the distinction between the real environment and a virtual screen is vague due to overlaps between a 3-dimensional (3D) virtual image and a real image viewed by a user.

VR technology allows a user to become immersed in a virtual environment and not to display a real environment. However, in AR technology, in which a real environment and virtual objects are mixed makes a user view the real environment, thus providing a better real sense and additional information as compared to VR technology. For example, when the surroundings are viewed on a smartphone camera, information, such as positions and telephone numbers of nearby shops, is displayed in a stereoscopic image.

The AR technology is used for remote medical diagnosis, broadcasting, architectural designs, manufacturing process management, and the like. Recently, the wide spread of smartphones makes the AR technology enter into a full-fledged commercialized stage, in which various products are introduced in the gaming, mobile solution, and education fields.

SUMMARY OF THE INVENTION

The present invention provides a method and apparatus for controlling a content reproducing device to intuitively share content while viewing a device in which the content is to be reproduced and a device which has the content.

According to an aspect of the present invention, a method of controlling a device is provided including identifying a registered device from a screen input by a camera; receiving a user input for the identified device; and transmitting a control command corresponding to the user input to the identified device.

According to another aspect of the present invention, a method of controlling a content reproducing device is provided, including identifying a registered device from a screen input by a camera; receiving content information from the identified device and displaying the content information; receiving a user input for the displayed content information; and executing a control command corresponding to the input.

According to another aspect of the present invention, an apparatus for controlling a device is provided, including a controller for identifying a registered device from a screen input by a camera; and a user input unit for receiving a user input for the identified device, wherein the controller transmits a control command corresponding to the input to the identified device.

According to another aspect of the present invention, an apparatus for controlling a content reproducing device is provided, including a controller for identifying a registered device from a screen input by a camera; a display unit for receiving content information from the identified device and displaying the content information; and a user input unit for receiving a user input for the displayed content information, wherein the controller executes a control command corresponding to the input.

BRIEF DESCRIPTION OF THE DRAWINGS

The above and other features, aspects and advantages of the present invention will become more apparent by describing in detail embodiments thereof with reference to the attached drawings in which:

FIGS. 4A and 4B illustrate an example of the method of FIG. 3;

FIG. 7 is a flowchart illustrating a method of controlling a content reproducing device, according to another embodiment of the present invention;

DETAILED DESCRIPTION OF EMBODIMENTS OF THE PRESENT INVENTION

The present invention will now be described more fully with reference to the accompanying drawings, in which embodiments of the invention are shown.

Figure 1:
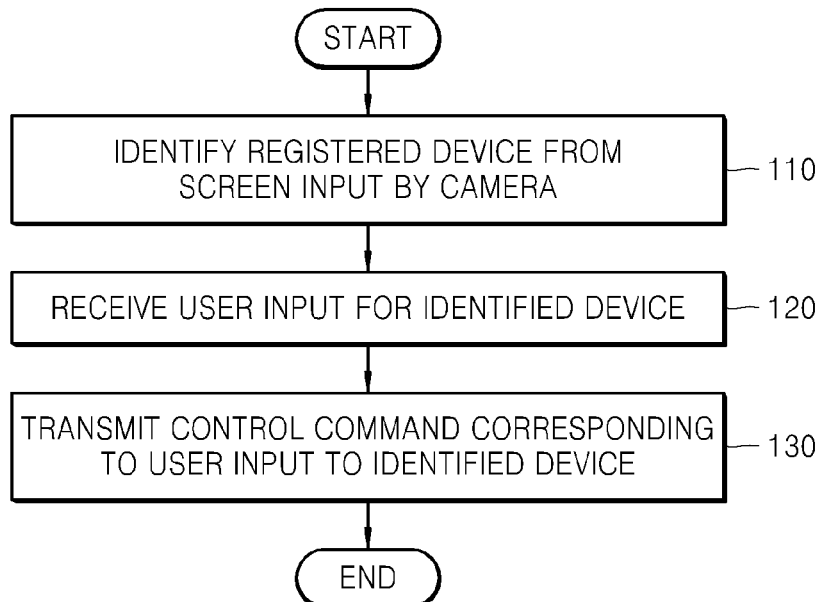
FIG. 1 is a flowchart illustrating a method of controlling a content reproducing device, according to an embodiment of the present invention.

FIG. 1 is a flowchart illustrating a method of controlling a content reproducing device, according to an embodiment of the present invention.

Referring to FIG. 1, in step 110, a content reproducing device controller identifies a registered device from a screen input by a camera. The registered device indicates a device of which image recognition information has already been stored in the content reproducing device controller. The content reproducing device controller stores image recognition information of devices recognized by the camera and device information of devices selected by a user in advance by matching them, respectively. The content reproducing device controller then compares image recognition information of a device recognized in an image input from the camera with the stored image recognition information and identifies a device corresponding to device information matching the compared image recognition information if the image recognition information of the device recognized from the screen input by the camera matches the stored image recognition information.

In step 120, the content reproducing device controller receives a user input for the identified device. For example, the content reproducing device controller may request the identified device for content information and receive and display the content information, or display content information stored therein. The content reproducing device controller may then receive a user input for moving the displayed content information to a reproducible identified device or receive a user input for reproducing content corresponding to the content information stored therein. As another example, when the content reproducing device controller displays content information of stored content, the content reproducing device controller may receive a user input for moving the displayed content information to a reproducible identified device. According to the present invention, an example of moving content information is dragging, by the user, one of a plurality of pieces of displayed content information and dropping the dragged content information onto the identified device.

In step 130, the content reproducing device controller transmits a control command corresponding to the user input to the identified device. In the example of step 120, the control command indicates a reproducing command of content corresponding to the content information. However, the control command is only an example and the present invention is not limited thereto.

Figure 2:
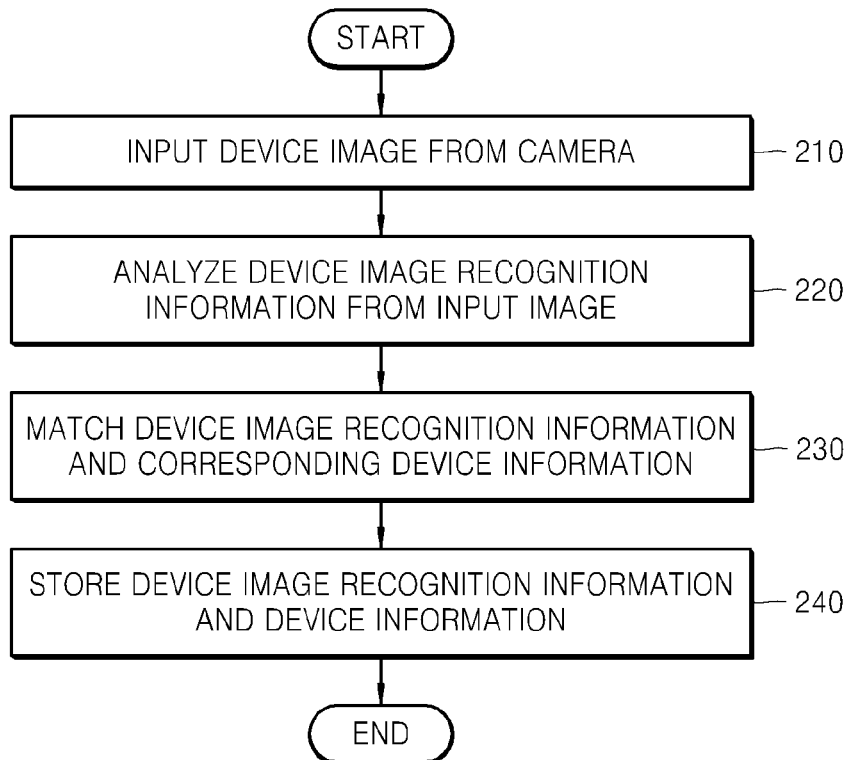
FIG. 2 is a flowchart illustrating a registering method, according to an embodiment of the present invention.

FIG. 2 is a flowchart illustrating a registering method, according to an embodiment of the present invention.

Referring to FIG. 2, in step 210, the content reproducing device controller receives an image of a device captured and displayed by the camera included therein.

In step 220, the content reproducing device controller analyzes device image recognition information from the received device image. Further, the content reproducing device controller searches for a device connectable via a predetermined network. The predetermined network is, for example, a wireless protocol-based network, such as Zigbee, Wi-Fi, Bluetooth, IEEE 802.11, Home Radio Frequency (HomeRF), Infrared Data Association (IrDA), Ultra Wide-Band (UWB), Near Field Communication (NFC), Radio Frequency Identification (RFID), or wireless 1394, or a wire-based protocol network such as Ethernet, Home Phoneline Networking Alliance (HomePNA), Power Line Communication (PLC), Institute of Electrical and Electronics Engineers (IEEE) 1394, or Universal Serial Bus (USB).

In step 230, the content reproducing device controller matches the analyzed device image recognition information to corresponding device information. For example, the content reproducing device controller displays the analyzed device image recognition information and the found connectable device. Thereafter, when a user selects the displayed device image recognition information and the found connectable device, the content reproducing device controller matches the selected device image recognition information to the found connectable device.

In step 240, the content reproducing device controller stores the device image recognition information and the device information. For example, the content reproducing device controller stores the displayed device image recognition information and device information (for example, a device-specific ID) of a connected device in a storage unit thereof. The content reproducing device controller also stores matching information of the two pieces of information.

Figure 3:
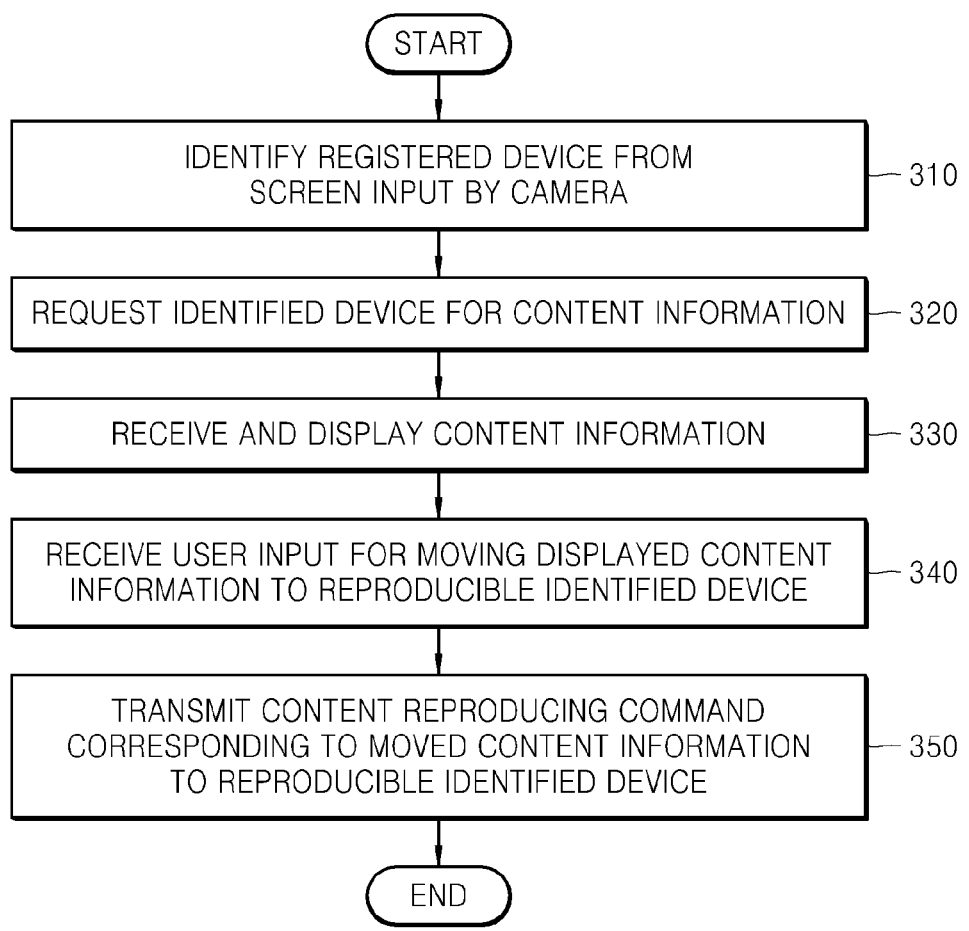
FIG. 3 is a flowchart illustrating a method of controlling a content reproducing device, according to an embodiment of the present invention.

FIG. 3 is a flowchart illustrating a method of controlling a content reproducing device, according to an embodiment of the present invention.

Referring to FIG. 3, in step 310, the content reproducing device controller identifies a registered device from a screen input by the camera. For example, the content reproducing device controller recognizes a device from the screen input by the camera. The content reproducing device controller then extracts image recognition information of the recognized device and compares the extracted device image recognition information with image recognition information of a device registered by the method of FIG. 2. If they match each other, the content reproducing device controller identifies the recognized device as a device matching the compared image recognition information. The content reproducing device controller may mark the identified device with a predetermined mark (for example, add a colored line to an outline to distinguish the device other devices). The content reproducing device controller may further mark a content-reproducible device among identified devices in a different method from the predetermined mark.

In step 320, the content reproducing device controller requests the identified device for content information. According to an embodiment of the present invention, the content information may include at least one of a thumbnail of the content, address information of the content, such as a storage folder name of the content, and a file name of the content. The thumbnail of the content and the file name of the content may also include the address information of the content.

In step 330, the content reproducing device controller receives and displays the content information. There is no limit in a method of displaying the content information. For example, the content reproducing device controller may display the content information by displaying it around the identified device that has transmitted it or display it in a menu screen, such as a play list, regardless of a position of the identified device. When the content information is plural, the content reproducing device controller may display the content information by limiting the number of pieces of the content information and further display other content information in response to a user input. For example, the content reproducing device controller may display the content information in a form of a semicircle around the identified device, and when a user inputs a clockwise or counterclockwise drag signal, the content reproducing device controller may rotate the content information and display other content information. According to another embodiment of the present invention, when the content reproducing device controller provides a focusing function, the content reproducing device controller may perform steps 310 to 330 for only a specific device instead of displaying content information of all registered devices.

In step 340, the content reproducing device controller receives a user input for moving the displayed content information to a reproducible identified device. The user moves the displayed content information to the identified device with a predetermined input means. For example, the user drags one piece of the displayed content information and drops it onto a reproducible identified device.

In step 350, the content reproducing device controller transmits a content reproducing command corresponding to the moved content information to the reproducible identified device. The content reproducing device controller may transmit address information of content corresponding to the moved content information together with the content reproducing command to the reproducible identified device. When the content address information is stored in the content reproducing device controller, the content reproducing device controller may transmit the content address information together with the content reproducing command to the reproducible identified device, and when the content address information is not stored in the content reproducing device controller, the content reproducing device controller may request and receive the content address information from the identified device that has transmitted the content information and transmit the content address information together with the content reproducing command to the reproducible identified device. Moreover, the content reproducing device controller may request the identified device that has transmitted the content information to directly transmit the content address information to the reproducible identified device. When the content address information is included in the content information, the above-described processes may not be necessary. The content reproducing device (the reproducible identified device) then receives and reproduces the content according to the content address information.

Figure 4B:
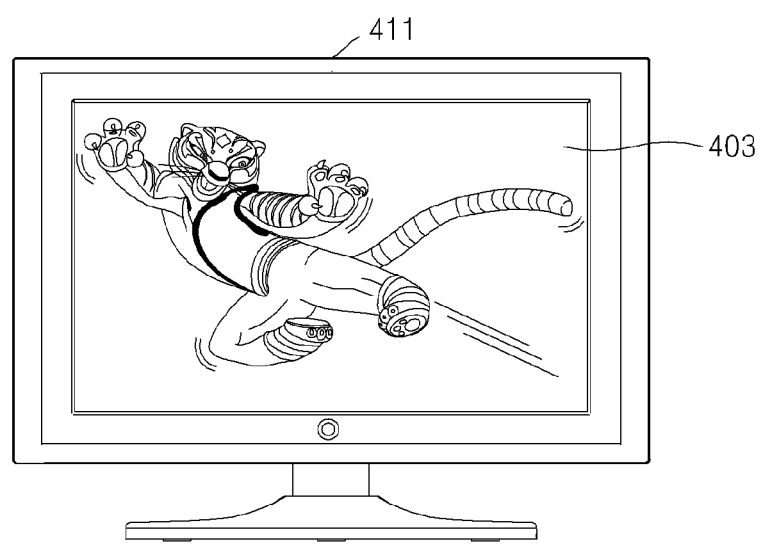

FIGS. 4A and 4B illustrate an example of the method of FIG. 3.

Referring to FIG. 4A, a content reproducing device controller 400 includes a display unit 410 and a camera 420. The content reproducing device controller 400 identifies a registered device in an image input from the camera 420. In FIG. 4A, devices displayed on a screen of the display unit 410 are a TV 411, a laptop 412, and a refrigerator 413. The content reproducing device controller 400 then identifies a registered device from among devices 411, 412, and 413 displayed on the screen of the display unit 410 via the camera 420. A predetermined mark (for example, a color added to an outline) may be added to the identified device to be discriminated from other devices. In FIG. 4A, it is assumed that the identified device includes the TV 411 and the laptop 412. After identifying the registered device, the content reproducing device controller 400 requests the identified device for content information. Thereafter, when the requested content information is received, the content reproducing device controller 400 displays the received content information on the screen of the display unit 410. In FIG. 4A, thumbnails 401, 402, 403 and 404 of respective pieces of content are displayed on the screen of the display unit 410 as examples of the content information. In FIG. 4A, the content thumbnails 401, 402, 403 and 404 are displayed around a device, i.e., the laptop 412, which has transmitted the content information. When a user 430 drags a certain thumbnail clockwise or counterclockwise, the content thumbnails 401, 402, 403 and 404 in the form of a semicircle rotate to display other thumbnails. When the user 430 drag-and-drops the content thumbnail 403 onto the TV 411 that is a reproducible identified device, as indicated by arrow 440, the content reproducing device controller 400 extracts a content address included in the content thumbnail 403, transmits the content address to the TV 411, and transmits a content reproducing command to the TV 411. The TV 411 then receives and reproduces content according to the received content address. FIG. 4B shows that the TV 411 reproduces content corresponding to the content thumbnail 403.

Figure 5:
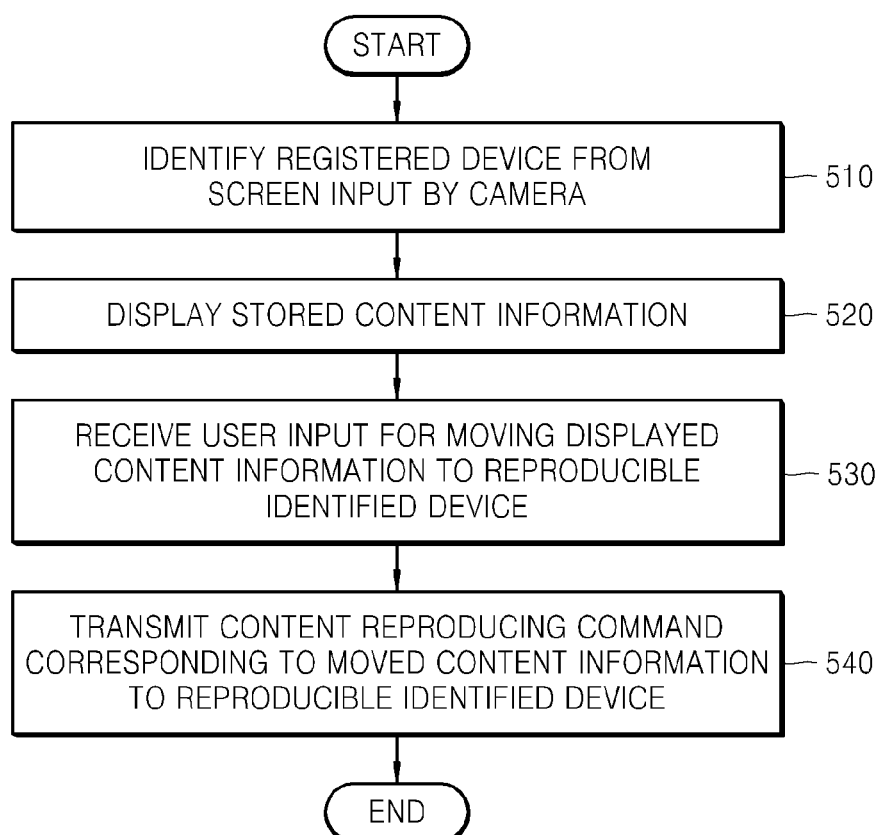
FIG. 5 is a flowchart illustrating a method of controlling a content reproducing device, according to another embodiment of the present invention.

FIG. 5 is a flowchart illustrating a method of controlling a content reproducing device, according to another embodiment of the present invention.

Referring to FIG. 5, since step 510 is identical to step 310 of FIG. 3, and thus a repeated description is omitted.

In step 520, the content reproducing device controller displays already-stored content information. That is, the content reproducing device controller displays content information stored therein. The content information is identical to the content information described in step 320 of FIG. 3. In step 520, after displaying content information received by requesting the content information from the identified device as in steps 320 and 330 of FIG. 3, the content reproducing device controller may further display the content information stored therein.

Steps 530 and 540 are similar to steps 340 and 350 of FIG. 3. However, there is a difference in that content information movable by the user is the content information of content stored in the content reproducing device controller. When content information is received from the identified device and further displayed, there is a difference in that content information movable by the user is not only the content information of content stored in the content reproducing device controller but also the received content information.

Figure 6A:
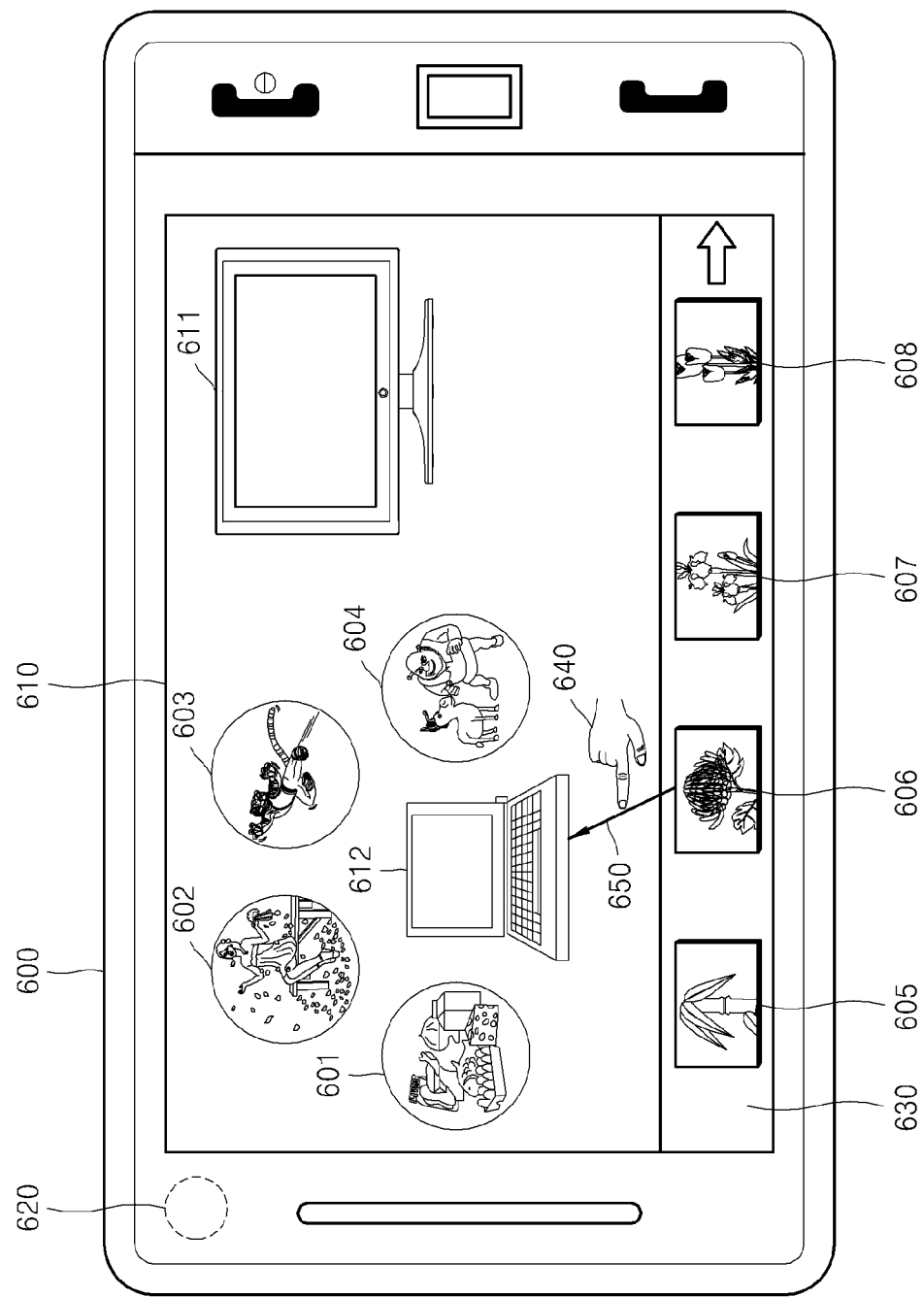
FIGS. 6A and 6B illustrate an example of the method of FIG. 5.
Figure 6B:
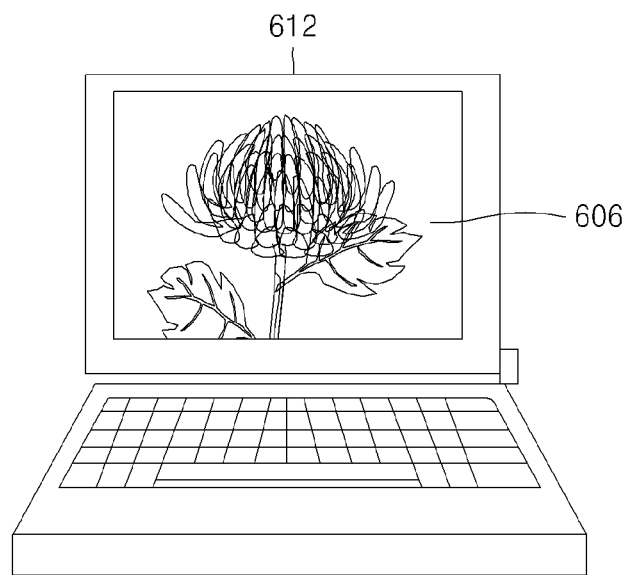

FIGS. 6A and 6B show an example of the method of FIG. 5.

Referring to FIG. 6A, a content reproducing device controller 600 includes a display unit 610 and a camera 620. The content reproducing device controller 600 identifies a registered device in an image input from the camera 620. In FIG. 6A, devices displayed on a screen of the display unit 610 are a TV 611 and a laptop 612. The content reproducing device controller 600 then identifies a registered device from among the devices displayed on the screen of the display unit 610 via the camera 620. A predetermined mark (for example, a color added to an outline) may be added to the identified device to distinguish the device from other devices. In FIG. 6A, it is assumed that the identified device includes the TV 611 and the laptop 612. The content reproducing device controller 600 displays content thumbnails 605 to 608, which are content information stored therein, in a predetermined area 630. Alternatively, or, the content reproducing device controller 600 additionally requests the identified device for content information. Thereafter, when the requested content information is received, the content reproducing device controller 600 displays the received content information on the screen of the display unit 610. In FIG. 6A, content thumbnails 601, 602, 603 and 604 of respective pieces of content are displayed on the screen of the display unit 610 as examples of the content information. A user 640 may drag-and-drop one of the stored content thumbnails 605 to 608 or one of the received content thumbnails 601, 602, 603 and 604 to move it to a reproducible identified device. In FIG. 6A, when the user 640 drag-and-drops the stored content thumbnail 606 to the laptop 612 that is a reproducible identified device, as indicated by arrow 650, the content reproducing device controller 600 extracts a content address corresponding to the content thumbnail 606, transmits the content address to the laptop 612, and transmits a content reproducing command to the laptop 612. Thereafter, the laptop 612 receives and reproduces content according to the received content address. FIG. 6B shows that the laptop 612 reproduces content corresponding to the content thumbnail 606.

FIG. 7 is a flowchart illustrating a method of controlling a content reproducing device, according to another embodiment of the present invention.

Referring to FIG. 7, since steps 710 to 730 are identical to steps 310 to 330 of FIG. 3, a repeated description is omitted.

In step 740, the content reproducing device controller receives a user input for the displayed content information. In FIG. 7, unlike the method of FIG. 3 or 5, the content reproducing device controller reproduces content corresponding to the displayed content information. That is, the user input is to reproduce content corresponding to content information selected by the user in the content reproducing device controller. Examples of an interface for the user input are recognizing an action of simply clicking content information as the user input and recognizing an action of activating a button (for example, dragging one piece of the displayed content information and dropping it to the button), which provides an interface for reproduction in the content reproducing device controller, as the user input.

In step 750, the content reproducing device controller reproduces content corresponding to the content information. The content reproducing device controller receives and reproduces the content according to address information of the content corresponding to the content information according to a user input.

Figure 8A:
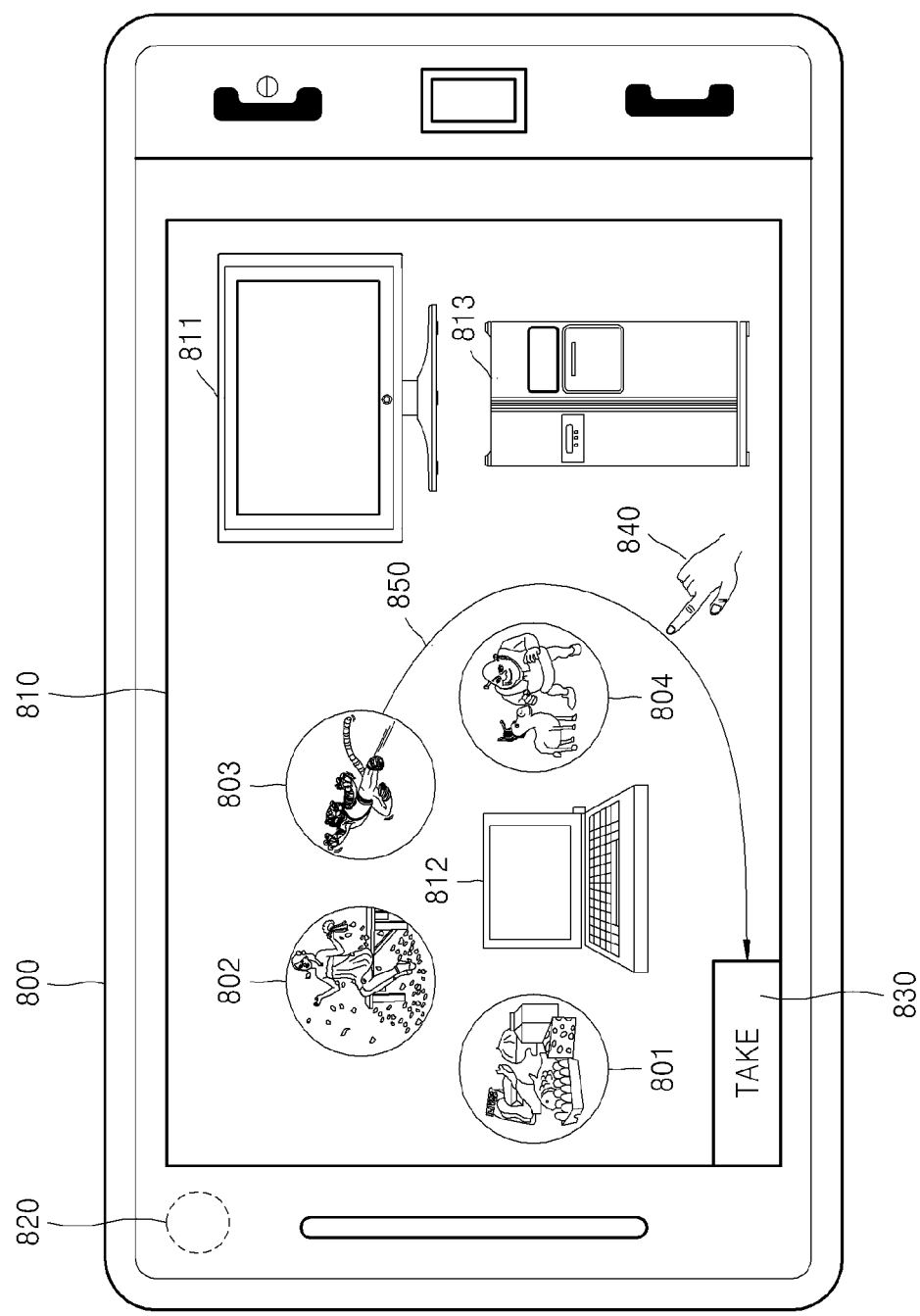
FIGS. 8A and 8B illustrate an example of the method of FIG. 7.
Figure 8B:
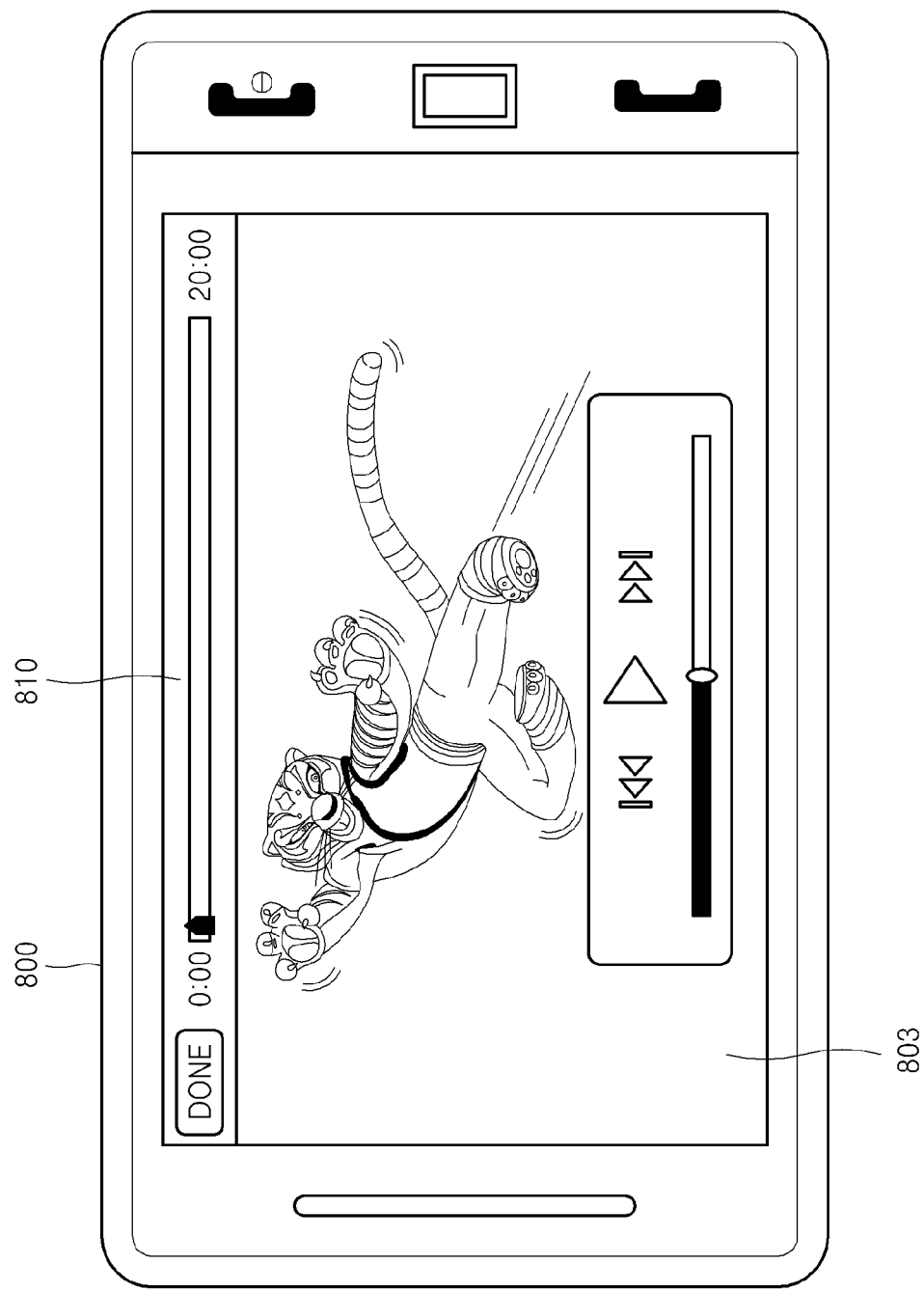

FIGS. 8A and 8B show an example regarding the method of FIG. 7.

Referring to FIG. 8A, a content reproducing device controller 800 includes a display unit 810 and a camera 820. The content reproducing device controller 800 identifies a registered device in an image input from the camera 820. In FIG. 8A, devices displayed on a screen of the display unit 810 are a TV 811, a laptop 812, and a refrigerator 813. The content reproducing device controller 800 then identifies a registered device from among the devices 811, 812, and 813 displayed on the screen of the display unit 810 via the camera 820. A predetermined mark (for example, add a color to an outline) may be added to the identified device to distinguish the identified device from other devices. In FIG. 8A, it is assumed that the identified device includes the TV 811 and the laptop 812. After identifying the registered device, the content reproducing device controller 800 requests the identified device for content information. When the requested content information is received, the content reproducing device controller 800 then displays the received content information on the screen of the display unit 810. In FIG. 8A, thumbnails 801, 802, 803 and 804 of respective pieces of content are displayed on the screen of the display unit 810 as examples of the content information. In FIG. 8A, the content thumbnails 801, 802, 803 and 804 are displayed around a device, i.e., the laptop 812, that has transmitted the content information. When a user 840 drags a certain thumbnail clockwise or counterclockwise, the content thumbnails 801, 802, 803 and 804 in a form of a semicircle rotate to display other thumbnails. When the user 840 drag-and-drops the content thumbnail 803 to a take button 830, as indicated by arrow 850, the content reproducing device controller 800 extracts a content address corresponding to the content thumbnail 803, receives content according to the content address, and reproduces the content therein. FIG. 8B shows that the content reproducing device controller 800 reproduces the content corresponding to the content thumbnail 803.

Figure 9:
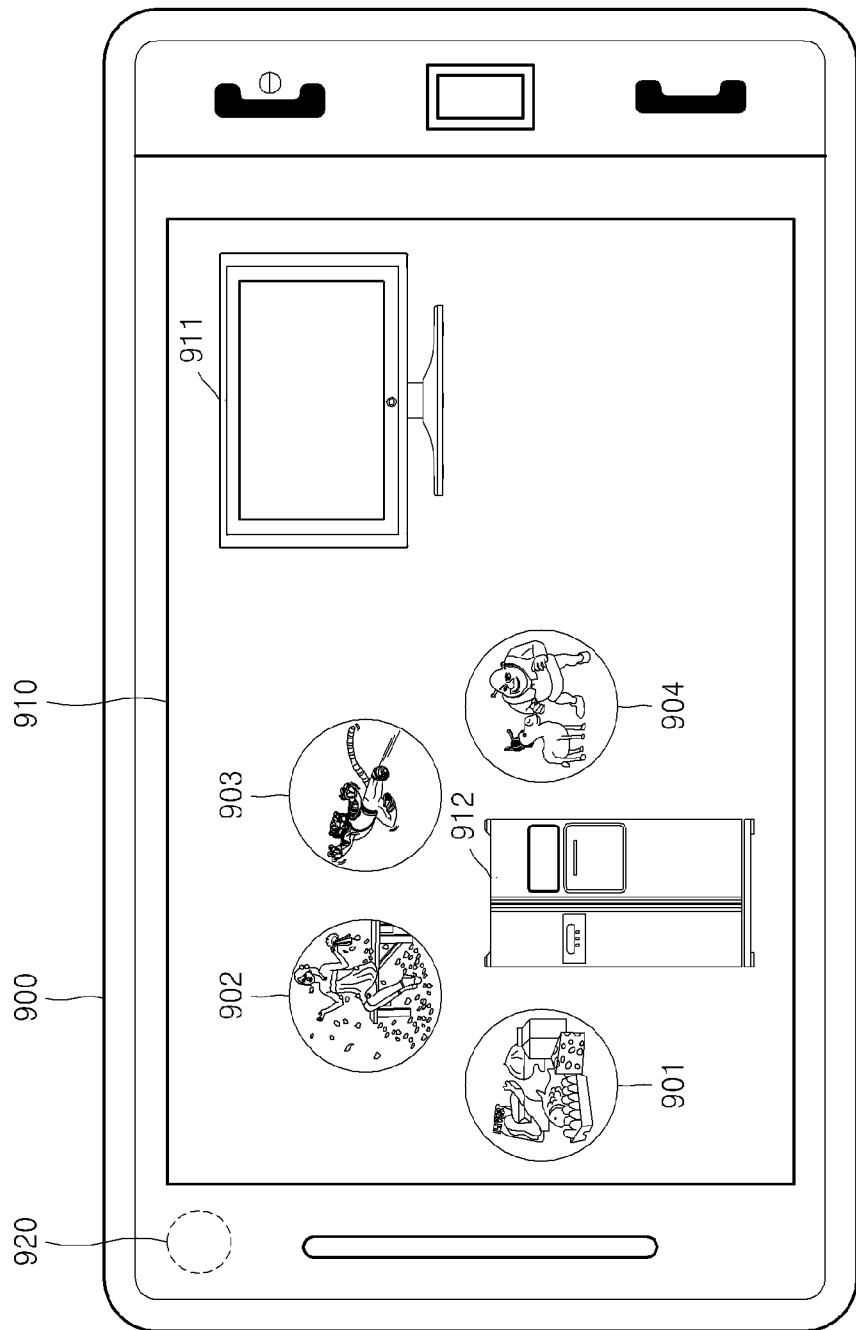
FIG. 9 illustrates an example of a method of controlling a content reproducing device, according to another embodiment of the present invention.

FIG. 9 shows an example of a method of controlling a content reproducing device, according to another embodiment of the present invention.

While a TV is rarely moved, a laptop may not have a fixed location and may be frequently moved. A device (for example, a refrigerator or a washing machine) having no content may be registered as a virtual laptop according to the method of FIG. 2. When a registered virtual device is viewed via the camera, the content reproducing device controller may identify a device registered as a laptop, request the device for content information, and display the content information. However, the virtually registered device must be connected to the laptop to communicate with each other. Referring to FIG. 9, when a content reproducing device controller 900 recognizes a refrigerator 912 on a screen of a display unit 910 via a camera 920, the content reproducing device controller 900 may recognize the refrigerator 912 as a laptop that is a registered device, request for and display content information 901, 902, 903 and 904, and perform the method of FIG. 3, 5, or 7.

According to another embodiment of the present invention, only if the content reproducing device controller maintains a communication state with a registered device, when there is an obstacle (for example, a wall), the content reproducing device controller may display the registered device, request the registered device for content information, and display the content information. Thereafter, the content reproducing device controller may perform the method of FIG. 3, 5, or 7.

Figure 10:
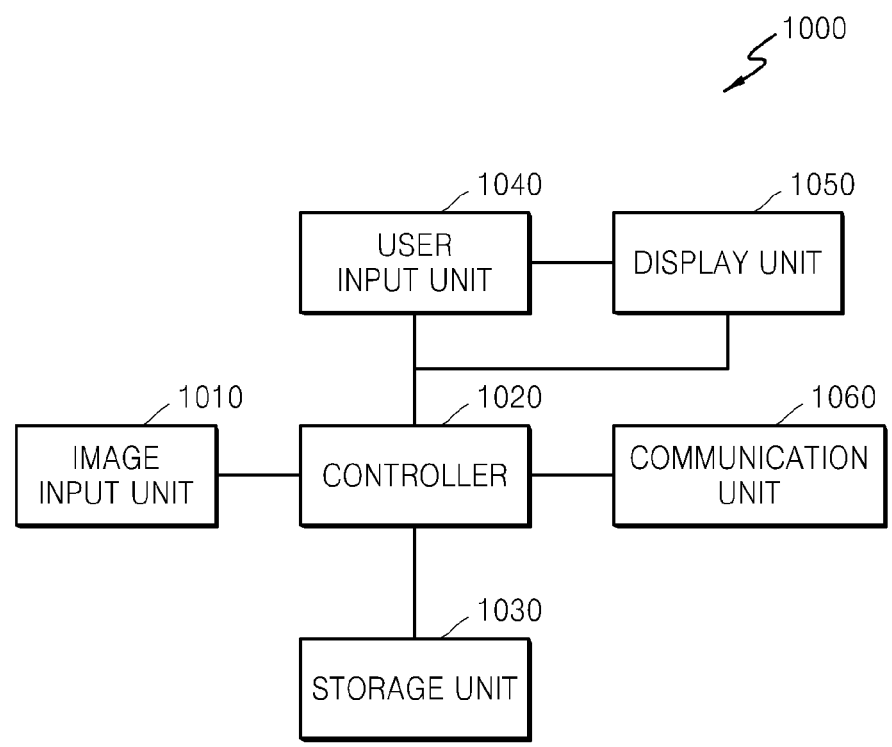
FIG. 10 is a block diagram of an apparatus for controlling a content reproducing device, according to an embodiment of the present invention.

FIG. 10 is a block diagram of an apparatus 1000 for controlling a content reproducing device, according to an embodiment of the present invention.

Referring to FIG. 10, the content reproducing device controller 1000 includes an image input unit 1010, a controller 1020, a storage unit 1030, a user input unit 1040, a display unit 1050, and a communication unit 1060. The content reproducing device controller 1000 is connected via a predetermined network to a device to be recognized by using the image input unit 1010. The predetermined network is, for example, a wireless protocol-based network, such as Zigbee, Wi-Fi, Bluetooth, IEEE 802.11, HomeRF, IrDA, UWB, NFC, RFID, or wireless 1394, or a wire protocol-based network, such as Ethernet, HomePNA, PLC, IEEE 1394, or USB.

The image input unit 1010 may be a camera. However, the image input unit 1010 is not limited to a camera, and there is no limit as long as it is a device for providing an image obtained by capturing an object.

The display unit 1050 displays an image input via the image input unit 1010. Moreover, the display unit 1050 displays content information to be described below.

The controller 1020 identifies a registered device on a screen of the display unit 1050 on which the image input via the image input unit 1010 is displayed. The registered device indicates a device of which image recognition information has already been stored in the storage unit 1030. The controller 1020 stores image recognition information of devices recognized by the image input unit 1010 and device information of devices selected by a user in advance by matching them, respectively. The controller 1020 then compares image recognition information of a device recognized in an image input from the image input unit 1010 with the stored image recognition information and identifies a device corresponding to device information matching the compared image recognition information if the image recognition information of the device recognized in the image input from the image input unit 1010 matches the stored image recognition information.

The user input unit 1040 receives a user input for the identified device. For example, the controller 1020 may request the identified device for content information by using the communication unit 1060 and receive and display the content information, or display content information stored in the storage unit 1030. The user input unit 1040 may receive a user input for moving the displayed content information to a reproducible identified device or receive a user input for reproducing content corresponding to the content information stored in the storage unit 1030. As another example, when the display unit 1050 displays content information of stored content, the user input unit 1040 may receive a user input for moving the displayed content information to a reproducible identified device. According to the present invention, an example of moving content information is dragging by the user, one of a plurality of pieces of displayed content information and dropping the dragged content information to the identified device. The user input unit 1040 may be, for example, a touchscreen or may be near the display unit 1050.

The controller 1020 then transmits a control command corresponding to the user input to the identified device via the communication unit 1060. The control command indicates a reproducing command of content corresponding to the content information. However, the control command is only an example and the present invention is not limited thereto.

Hereinafter, an embodiment for the content reproducing device controller 1000 performing a method of registering a predetermined device is described.

The controller 1020 receives an image of a device captured by the image input unit 1010 and displayed by the display unit 1050. The controller 1020 then analyzes device image recognition information from the received device image. Furthermore, the controller 1020 searches for a device connectable via a predetermined network. Thereafter, the controller 1020 displays the analyzed device image recognition information and the found connectable device on the display unit 1050. Thereafter, when the user selects via the user input unit 1040 the device image recognition information and the found connectable device displayed on the display unit 1050, the controller 1020 matches the selected device image recognition information to the found connectable device. Thereafter, the controller 1020 stores the device image recognition information and the device information in the storage unit 1030.

Hereinafter, a first embodiment for the content reproducing device controller 1000 performing a content reproducing device control method will be described.

The controller 1020 identifies a registered device in an image input from the image input unit 1010. For example, the controller 1020 recognizes a device in the image input from the image input unit 1010, extracts image recognition information of the recognized device, and compares the extracted device image recognition information with image recognition information of registered devices stored in the storage unit 1030. If they match one another, the controller 1020 identifies the recognized device as a device matching the compared image recognition information. The controller 1020 may mark the identified device with a predetermined mark (for example, a colored line added to an outline so it can be distinguished from other devices) on the display unit 1050. The controller 1020 may further mark a content-reproducible device among identified devices in a different method from the predetermined mark.

The controller 1020 requests the identified device for content information via the communication unit 1060. According to an embodiment of the present invention, the content information may include at least one of a thumbnail of the content, address information of the content, such as a storage folder name of the content, and a file name of the content. The thumbnail of the content and the file name of the content may also include the address information of the content.

The display unit 1050 receives and displays the content information. There is no limit in a method of displaying the content information. For example, the display unit 1050 may display the content information by displaying it around the identified device that has transmitted it or display it in a menu screen, such as a play list, irrespective of a position of the identified device. When there are multiple pieces of content information, the display unit 1050 may display the content information by limiting the number of pieces of the content information and further display other content information in response to a user input. For example, the display unit 1050 may display the content information in a form of a semicircle around the identified device that has transmitted it, and when a user inputs a clockwise or counterclockwise drag signal via the user input unit 1040, the display unit 1050 may rotate the content information to display other content information. According to another embodiment of the present invention, when the content reproducing device controller 1000 provides the focusing function, the display unit 1050 may display only content information associated with a specific device instead of displaying content information of all registered devices.

The user input unit 1040 receives a user input for moving the displayed content information to a reproducible identified device. The user moves the displayed content information to the identified device with a predetermined input means by using the user input unit 1040. For example, the user drags one piece of the displayed content information and drops it onto a reproducible identified device.

Thereafter, the controller 1020 transmits a content reproducing command corresponding to the moved content information to the reproducible identified device. The controller 1020 may transmit address information of content corresponding to the moved content information together with the content reproducing command to the reproducible identified device via the communication unit 1060. When the content address information is stored in the storage unit 1030, the controller 1020 may transmit the content address information together with the content reproducing command to the reproducible identified device, and when the content address information is not stored in the storage unit 1030, the controller 1020 may request and receive the content address information from the identified device that has transmitted the content information and transmit the content address information together with the content reproducing command to the reproducible identified device. Also, the controller 1020 may request the identified device that has transmitted the content information to directly transmit the content address information to the reproducible identified device. When the content address information is included in the content information, the above-described processes may not be performed. Thereafter, the content reproducing device (the reproducible identified device) receives and reproduces the content according to the content address information.

Hereinafter, a second embodiment for the content reproducing device controller 1000 performing a content reproducing device control method is described.

The display unit 1050 displays content information corresponding to content stored in the storage unit 1030. That is, the display unit 1050 displays content information stored in the content reproducing device controller 1000. The display unit 1050 may also display content information received from an external device as described in the first embodiment.

The user input unit 1040 receives a user input for moving the displayed content information to a reproducible identified device. The controller 1020 then transmits a content reproducing command corresponding to the moved content information to the reproducible identified device.

That is, the second embodiment is different from the first embodiment in that content stored in the content reproducing device controller 1000 can also be displayed and transmitted to a reproducible registered device.

Hereinafter, a third embodiment for the content reproducing device controller 1000 performing a content reproducing device control method is described.

The user input unit 1040 receives a user input for displayed content information. The user input is to reproduce content corresponding to content information selected by the user in the content reproducing device controller 1000. Examples of an interface for the user input are recognizing an action of simply clicking content information as the user input and recognizing an action of activating a button (for example, dragging one piece of the displayed content information and dropping it onto the button), which provides an interface for reproduction in the content reproducing device controller 1000, in the user input unit 1040 as the user input.

The controller 1020 reproduces content corresponding to the content information. The controller 1020 receives and reproduces the content according to address information of the content corresponding to the content information according to a user input.

The third embodiment is different from the first embodiment in that content corresponding to displayed content information is reproduced by the content reproducing device controller 1000.

According to another embodiment of the present invention, the controller 1020 may register a device (for example, a refrigerator or a washing machine) having no content as a virtual device having content. When a device having no content is viewed via the image input unit 1010, the controller 1020 may identify the device as a registered device, request the device for content information, and display the content information. However, the device having no content must be connected to the virtual device to communicate with each other.

According to another embodiment of the present invention, if only the content reproducing device controller 1000 maintains a communication state with a registered device, even when there is an obstacle (for example, a wall), the controller 1020 may display the registered device, request the registered device for content information, display the content information, and perform the content reproducing device control method.

The methods of controlling a content reproducing device can also be embodied as computer-readable codes on a computer-readable storage medium. The computer-readable recording medium is any data-recording medium that can store data which can be thereafter read by a computer system. Examples of the computer-readable recording medium include Read-Only Memory (ROM), Random-Access Memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments for accomplishing the present invention can be easily construed by programmers skilled in the art to which the present invention pertains.

While this invention has been particularly shown and described with reference to certain embodiments thereof, it will be understood by those skilled in the art that various changes in form and details may be made therein without departing from the spirit and scope of the invention as defined by the appended claims and their equivalents.

What is claimed is:

1. A method of controlling a device performed by an electronic apparatus, the method comprising:
   identifying a plurality of registered devices from a captured image through a camera of the electronic apparatus;
   receiving, from a first registered device among the plurality of registered devices, a content image which represents content stored in the first registered device;
   displaying the content image around a device image representing the first registered device on a display of the electronic apparatus;
   receiving a user input to select the displayed content image; and
   transmitting a control command regarding reproduction of the content corresponding to the content image to a second registered device among the plurality of registered devices,
   wherein receiving the user input to select the content image includes receiving a user input for moving the content image to another device image representing the second registered device,
   wherein the device image representing the first registered device, the content image which represents the content stored in the first registered device, and a content image which represents content stored in the electronic apparatus are displayed together with the another device image representing the second registered device.

2. The method of claim 1,
   wherein the second registered device is capable of reproducing the content corresponding to the moved content image.

3. The method of claim 1,
   wherein transmitting the control command includes requesting the first device to provide the content corresponding to the moved content image to the second registered device.

4. The method of claim 1, wherein the content image representing the content stored in the first registered device comprises:
   at least one of a content thumbnail, content metadata, and a content file name.

5. The method of claim 1, further comprising:
transmitting a content reproducing command corresponding to the moved content image to the second registered device.

6. The method of claim 5, further comprising:
transmitting an address of the content to the second registered device.

7. The method of claim 1, wherein receiving the user input for moving the displayed content image to the second registered device comprises:
receiving a user input for dragging the displayed content image to the other device image representing the second registered device.

8. At least one non-transitory computer-readable recording medium for storing a computer program configured to be readable by at least one processor for instructing the at least one processor to execute a computer process for performing the method of claim 1.

9. A method of controlling a content reproducing device performed by an electronic apparatus, the method comprising:
identifying a plurality of registered devices from an image input through a camera of the electronic apparatus;
receiving, from a first registered device among the plurality of registered devices, a content image which represents content stored in the first registered device;
displaying the content image around a device image representing the first registered device on a display of the electronic apparatus;
receiving a user input for the displayed content image; and
executing a control command regarding reproduction of the content in response to the user input,
wherein receiving the user input for the displayed content image includes receiving a user input for moving the displayed content image to another device image representing a second registered device, and
wherein the device image representing the first registered device, the content image which represents the content stored in the first registered device, and a content image which represents content stored in the electronic apparatus are displayed together with the second device image representing the second registered device.

10. The method of claim 9, wherein the content image representing the content stored in the first registered device comprises:
at least one of a content thumbnail, content metadata, and a content file name.

11. The method of claim 9, wherein executing the control command comprises reproducing the content corresponding to the content image.

12. The method of claim 9, further comprising:
matching and registering image information of a predetermined device recognized by a predetermined camera and information regarding the predetermined recognized device,
wherein identifying the plurality of registered devices from the screen input by the camera includes:
recognizing a device by a predetermined image analysis for the screen input by the camera;
comparing image information of the recognized device with predetermined registered image information; and
if the image information of the recognized device matches the predetermined registered image information, identifying the recognized device.

13. At least one non-transitory computer-readable recording medium for storing a computer program configured to be readable by at least one processor for instructing the at least one processor to execute a computer process for performing the method of claim 9.

14. An electronic apparatus for controlling a device, the electronic apparatus comprising:
a processor for identifying a plurality of registered devices from an image captured through a camera of the electronic apparatus;
a communication interface for receiving, from a first registered device from among the plurality of registered devices, a content image which represents content stored in the first registered device;
a display for displaying the received content image around a device image representing the first registered device; and
a user input interface for receiving a user input to select the displayed content image,
wherein the processor provides a control command regarding reproduction of the content corresponding to the selected content image to a second registered device among the plurality of registered devices, and
wherein receiving the user input to select the displayed content image includes receiving a user input for moving the content image to another device image representing the second registered device,
wherein the device image representing the first registered device, the content image which represents the content stored in the first registered device, and a content image which represents content stored in the electronic apparatus are displayed together with the another device image representing the another registered device.

15. The electronic apparatus of claim 14,
wherein the second registered device is capable of reproducing the content corresponding to the moved content image.

16. The electronic apparatus of claim 15, wherein the processor transmits a content reproducing command corresponding to the moved content image to the second registered device.

17. The electronic apparatus of claim 16, wherein the processor transmits an address of the content to the second registered device.

18. The electronic apparatus of claim 14,
wherein the processor requests that the identified registered device provide the content corresponding to the moved content image to the second registered device.

19. The electronic apparatus of claim 14, wherein the content image representing the content stored in the first registered device comprises:
at least one of a content thumbnail, content metadata, and a content file name.

20. The electronic apparatus of claim 14, wherein the user input interface receives a user input for dragging the content image to the other device image representing the second registered device.

21. An electronic apparatus for controlling a content reproducing device, the electronic apparatus comprising:
a processor for identifying a plurality of registered devices from an image input through a camera of the electronic apparatus;
a communication interface for receiving, from a first registered device among the plurality of registered devices, a content image which represents content stored in the first registered device;

a display for displaying the content image around a device image representing the first registered device; and a user input interface for receiving a user input to select the displayed content image, wherein the processor executes a control command regarding reproduction of the content corresponding to the selected content image to a second registered device among the plurality of registered devices, wherein receiving the user input to select the displayed content image includes receiving a user input for moving the displayed content image to another device image representing the second registered device, and wherein the device image representing the first registered device, the content image which represents the content stored in the first registered device, and a content image which represents content stored in the electronic apparatus are displayed together with the another device image representing the second registered device.

22. The electronic apparatus of claim 21, wherein the content image representing the content stored in the first registered device comprises:

at least one of a content thumbnail, content metadata, and a content file name.

23. The electronic apparatus of claim 21, wherein the processor reproduces the content corresponding to the content image by using the display.

24. The electronic apparatus of claim 21, wherein the processor matches and registers image information of a predetermined device recognized by a predetermined camera and information regarding the predetermined recognized device, recognizes a device by a predetermined image analysis for the screen input by the camera, compares image information of the recognized device with predetermined registered image information, and, if the image information of the recognized device matches the predetermined registered image information, identifies the recognized device.

* * * * *